United States Patent
Marupaduga

(10) Patent No.: US 11,832,136 B2
(45) Date of Patent: Nov. 28, 2023

(54) DYNAMIC HANDOVER TRIGGER BASED ON PRIMARY PATH THROUGHPUT

(71) Applicant: T-Mobile Innovations LLC, Overland Park, KS (US)

(72) Inventor: Sreekar Marupaduga, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 17/987,999

(22) Filed: Nov. 16, 2022

(65) Prior Publication Data
US 2023/0076600 A1    Mar. 9, 2023

Related U.S. Application Data

(63) Continuation of application No. 17/065,006, filed on Oct. 7, 2020.

(51) Int. Cl.
   *H04W 36/08*  (2009.01)
   *H04W 36/00*  (2009.01)
   *H04L 5/00*   (2006.01)

(52) U.S. Cl.
   CPC ....... *H04W 36/0058* (2018.08); *H04L 5/0048* (2013.01); *H04W 36/0079* (2018.08); *H04W 36/08* (2013.01)

(58) Field of Classification Search
   CPC ......... H04W 36/0058; H04W 36/0079; H04W 36/08; H04W 5/0048
   See application file for complete search history.

(56) References Cited

U.S. PATENT DOCUMENTS

| | | |
|---|---|---|
| 6,266,531 B1 | 7/2001 | Zadeh et al. |
| 2016/0242077 A1 | 8/2016 | Horneman et al. |
| 2016/0277986 A1 | 9/2016 | Ekemark et al. |
| 2017/0094572 A1* | 3/2017 | Yang ............... H04W 76/27 |
| 2018/0199236 A1* | 7/2018 | Xu ................... H04W 76/27 |
| 2019/0007996 A1* | 1/2019 | Boudreau .......... H04W 8/005 |
| 2019/0306742 A1* | 10/2019 | Yang ............... H04W 40/12 |
| 2019/0357097 A1 | 11/2019 | Rugeland et al. |
| 2020/0021689 A1 | 1/2020 | Sultana et al. |
| 2020/0100151 A1* | 3/2020 | Kumar ............. H04W 36/0055 |
| 2020/0112911 A1 | 4/2020 | Ozturk et al. |
| 2020/0178333 A1 | 6/2020 | Liu et al. |
| 2020/0389823 A1 | 12/2020 | Xu et al. |
| 2023/0014613 A1* | 1/2023 | Je ................... H04W 36/0058 |
| 2023/0073178 A1* | 3/2023 | Holmbacka ....... H04W 52/0206 |

* cited by examiner

Primary Examiner — Barry W Taylor
(74) Attorney, Agent, or Firm — Jones Robb, PLLC

(57) ABSTRACT

Systems and methods are provided for dynamically triggering a handover of a wireless device based on a throughput measurement of a source node and a target node on a primary path. The method includes comparing the first throughput measurement at the source access node for the primary path to the second throughput measurement at the target access node or comparing both throughput measurements to predetermined criteria and making a handover determination for the wireless device based on the comparison.

20 Claims, 7 Drawing Sheets

DYNAMIC HANDOVER TRIGGER BASED ON PRIMARY PATH THROUGHPUT

This patent application is a continuation of U.S. patent application Ser. No. 17/065,006, filed on Oct. 7, 2020, which is incorporated by reference in its entirety for all purposes.

TECHNICAL BACKGROUND

A wireless network, such as a cellular network, can include an access node (e.g., base station) serving multiple wireless devices or user equipment (UE) in a geographical area covered by a radio frequency transmission provided by the access node. As technology has evolved, different carriers within the cellular network may utilize different types of radio access technologies (RATs). RATs can include, for example, 3G RATs (e.g., GSM, CDMA etc.), 4G RATs (e.g., WiMax, LTE, etc.), and 5G RATs (new radio (NR)). Further, different types of access nodes may be implemented for deployment for the various RATs. For example, an eNodeB may be utilized for 4G RATs and a gNodeB may be utilized for 5G RATs. Deployment of the evolving RATs in a network provides numerous benefits. For example, newer RATs may provide additional resources to subscribers, faster communications speeds, and other advantages.

To ensure consistent coverage through a wide geographic range, existing technologies such as 4G can be used in combination with newer technologies such as 5GNR. In an E-UTRAN New Radio-Dual Connectivity (EN-DC) configuration, wireless devices connect to an LTE eNodeB and NR gNodeB. One node may act as a master node and the other as a secondary node. Thus, EN-DC allows devices to access both LTE and 5G simultaneously. In an EN-DC cell, more uplink noise or high received signal strength indicator (RSSI) may exist because 5G UEs are connecting to both the LTE node and 5G node. Access to high data speeds is improved if a high signal to interference and noise ratio (SINR) is present.

In cases of high noise and interference, quality of service (QOS) of a wireless device is likely to be negatively impacted. In order to avoid prolonged decreases in QOS or other performance parameters, wireless devices report measurements to an access node to indicate conditions over a channel at a specific time. When conditions meet specified thresholds, the master node may order a handover of the wireless device to an alternate node or additional node.

With any RAT including 3G, 4G, and 5G, mobility or handover decisions are made by the access node or base station based on measurement reports from the wireless devices. Multiple measurement items, such as reference signal receive power (RSRP), reference signal received quality (RSRQ), and signal to interference and noise ratio (SINR) may be included in the measurement reports. The reports can help determine the signal quality of the serving cell and neighbor cells. Handovers may be triggered when the signal quality for a neighboring cell or a different RAT is better than the signal quality of the serving sector and/or RAT. Handovers, when performed, may cause a wireless device to be served by a different antenna in a different sector or by an antenna in the same sector utilizing a different RAT.

However, while signal quality is an indicator of performance, a tradeoff exists between throughput and signal quality. While a neighboring node may offer a higher signal quality, the throughput capabilities of the neighboring node may also impact the performance of the wireless device, particularly when the wireless device is transmitting large amounts of data over a primary path. Thus, if a neighboring node has inferior throughput capabilities to the source node, it may be undesirable for a handover to occur if large volumes of data could not be efficiently transmitted. Accordingly, a solution is needed that dynamically considers throughput capabilities of both a source node and a target node during mobility decisions. Further, a system is needed that considers whether a path is being utilized as a primary or secondary data path during mobility decisions. Such a system would improve overall resource utilization and wireless device performance within a wireless network.

OVERVIEW

Exemplary embodiments described herein include systems, methods, and processing nodes for dynamically managing a handover of a wireless device. Exemplary embodiments of the method include identifying a first throughput measurement at a source access node for a primary path of the wireless device and identifying a second throughput measurement at a target access node. The method additionally includes comparing the first throughput measurement at the source access node for the primary path to the second throughput measurement at the target access node and making a handover determination for the wireless device based on the comparison.

Additional exemplary embodiments include a processing node configured to perform multiple operations. The operations include comparing a first throughput measurement at a source access node for a primary path of a wireless device with handover criteria and comparing a second throughput measurement at a target access node with the handover criteria. The operations further include delaying handover of the wireless device from the source access node to the target access node when at least one of the first throughput measurement and the second throughput measurement fails to satisfy the handover criteria.

Exemplary embodiments further include a system for dynamically managing a handover of the wireless device. The system includes at least one master node and multiple secondary nodes and a processor coupled to the master node configured to perform multiple operations. The operations include identifying a first throughput measurement at a source access node for a primary path of a wireless device and identifying a second throughput measurement at a target access node. The operations additionally include comparing the first throughput measurement at the source access node for the primary path to the second throughput measurement at the target access node and making a handover determination for the wireless device based on the comparison.

DETAILED DESCRIPTION

Figure 1:
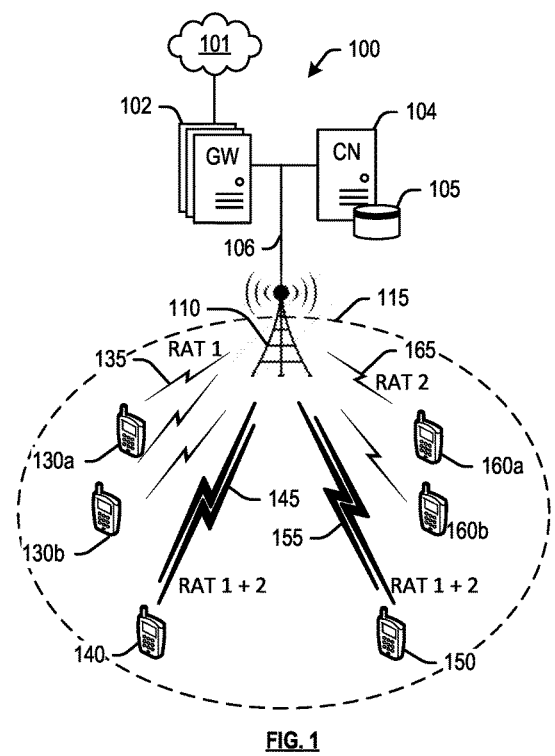
FIG. 1 depicts an exemplary system for wireless communication, in accordance with the disclosed embodiments.

Exemplary embodiments described herein include systems, methods, and processing nodes for dynamically managing handovers of wireless devices between access nodes. Embodiments operate in environments with networks utilizing an EN-DC architecture, which allows devices to access both LTE and 5G simultaneously. Other network configurations are within scope of the disclosure.

In embodiments disclosed herein, a cell or wireless network may be provided by an access node. The access node may utilize one or more antennas to communicate with wireless devices or UEs. Performance at a particular wireless device may be dependent on a number of factors including, for example, signal strength parameters and interference indicators. Values such as signal to interference and noise ratio (SINR), reference signal received power (RSRP), reference signal received quality (RSRQ) or other measurements may be periodically measured by the access nodes or measured and reported by the wireless devices over a communication network to an access node. Additional signal performance parameters may be reported, including, for example, channel quality indicator (CQI), and rank index (RI).

Because certain network conditions are likely to result in poor performance, embodiments provided herein set handover criteria to enhance performance parameters for each wireless device and dynamically perform handovers when the handover criteria are met are met. In embodiments set forth herein, the handover criteria can be set at the access node and measurements performed by the wireless devices or at the access nodes can trigger a determination of whether the handover criteria are met.

Embodiments disclosed herein are particularly directed to dynamically triggering a handover for a wireless device in a 5G EN-DC cell. In an EN-DC network with multiple channel allocations for a wireless device, the wireless device utilizes a primary path and a secondary path. The identification of the primary path and the secondary path is based on the total volume of data transmitted. The path over which the larger percentage of data is transmitted is the primary path and the path over which the smaller percentage of data is transmitted is the secondary path. Frequently, an eNodeB serves as a master node and a connected wireless device also connects with a gNodeB as a secondary node. Generally, the gNodeB will offer higher throughput than the eNodeB and will thus be able to accommodate a larger percentage of the data than the eNodeB. Therefore, the wireless devices may use a newer RAT air interface supplied by the gNodeB as the primary path and the older RAT air interface for communicating with the eNodeB as the secondary path. Thus, in embodiments disclosed herein, the primary path may be over a first RAT, e.g., a 5G RAT, and the secondary path may be over a second RAT, e.g., a 4G RAT. Embodiments disclosed herein dynamically facilitate a handover from a first or source node used for the primary path to a second or target node, which will also facilitate wireless device communication over the primary path.

Embodiments proposed herein dynamically determine whether the pre-set handover criteria are satisfied, and dynamically trigger the handover after measurement of available throughput at a source access node on a primary path and a target access node for the primary path. The handover is triggered only when the handover criteria are met, and the criteria may include a comparison of the available throughput at the source node and the target node. If the available throughput at the target node is lower than throughput at the source node, the handover may not be triggered. If the available throughput at the target node is greater than or equal to the available throughput at the source node on the primary path, the handover may be dynamically triggered.

In exemplary embodiments, a processor or processing node associated with an access node may make a determination of whether pre-set handover criteria are met. When the handover criteria are met, the processor or processing node may compare available throughput measurements of a source node on a primary path and a target node on the primary path. The processor or processing node may dynamically trigger a handover of a wireless device when the available throughput of the target node satisfies a predetermined threshold. In embodiments set forth herein, the threshold may be set to equal the available throughput of the source node. Other thresholds are within scope of the disclosure.

Accordingly, a solution as described herein delays a handover trigger until available throughput at a target node exceeds available throughput at a source node, thereby enabling rapid data transmission over the primary path. As explained above, while the signal strength parameters are important to the performance of the wireless device, available throughput may also be considered on the primary path as large amounts of data may need to be transmitted over the primary path. Therefore, in accordance with embodiments disclosed herein, methods and systems consider both signal strength parameters and available throughput at the source and target access nodes on the primary path. Once the system determines that a handover would improve wireless device performance, in embodiments disclosed herein, the system instructs the wireless device to handover to the target node, for example by utilizing a radio resource control (RRC) reconfiguration message.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include an end-user wireless device that communicates with the access node directly without being relayed by a relay node.

The terms "transmit" and "transmission" in data communication may also encompass receive and receiving data. For example, "data transmission rate" may refer to a rate at which the data is transmitted by a wireless device and/or a rate at which the data is received by the wireless device.

An exemplary system described herein includes at least an access node (or base station), such as an eNodeB, a next generation NodeB (gNodeB), and a plurality of end-user wireless devices. For illustrative purposes and simplicity, the disclosed technology will be illustrated and discussed as being implemented in the communications between an access node (e.g., a base station) and a wireless device (e.g., an end-user wireless device). It is understood that the disclosed technology for may also be applied to communication between an end-user wireless device and other network resources, such as relay nodes, controller nodes, antennas, etc. Further, multiple access nodes may be utilized. For example, some wireless devices may communicate with an LTE eNodeB and others may communicate with an NR gNodeB.

In addition to the systems and methods described herein, the operations for dynamically triggering a handover may be implemented as computer-readable instructions or methods, and processing nodes on the network for executing the instructions or methods. The processing node may include a processor included in the access node or a processor included in any controller node in the wireless network that is coupled to the access node.

FIG. 1 depicts an exemplary system for wireless communication. System 100 may be a wireless communication network, such as a cellular network. System 100 may include a communication network 101, a gateway 102, a controller node 104, a database 105, and one or more access nodes 110. One or more end-user wireless devices may be directly connected to access node 110, such as end-user wireless devices 130a, 130b, 140, 150, 160a, and 160b.

In this exemplary embodiment, access node 110 may be a macrocell access node configured to deploy at least two different carriers, each of which utilizes a different RAT air interface. For example, a first carrier may be deployed by access node 110 in an LTE mode, and a second carrier may be deployed by access node 110 in an NR mode. Thus, in an embodiment, access node 110 may comprise two co-located cells, or antenna/transceiver combinations that are mounted on the same structure. In some embodiments, multiple access nodes 110 may be deployed and each access node 110 may support a different RAT. For example, a gNodeB may support NR and an eNodeB may provide LTE coverage.

In embodiments disclosed herein, wireless devices may utilize one RAT as a primary path and another as a secondary path. The primary path may be used to transmit a larger quantity of data than the secondary path. The carriers may further utilize different frequency bands or sub-bands and additionally may be deployed using different types of multiplexing modes. In other embodiments, any other combination of access nodes and carriers deployed therefrom may be evident to those having ordinary skill in the art in light of this disclosure.

Wireless devices 130a, 130b, 140, 150, 160a, and 160b are illustrated as being in communication with access node 110 over various types of communications links. Each of the end-user wireless devices 130a, 130b, 140, 150, 160a, and 160b may be attached to the wireless air interface deployed by access node 110. Wireless links 135 and 165, as well as other wireless links that directly couple end-user wireless devices 140a, 140b, 140c, and 140d with access node 110, as shown in FIG. 1, form the wireless network (or wireless radio air interface) deployed by access node 110 within coverage area 115.

In disclosed embodiments, wireless devices 130a and 130b are illustrated as being in communication with access node 110 using a first RAT, which may provide, for example an NR communications link 135. The NR communication link 135 may comprise any communication channel that utilizes air-interface resources of an NR carrier deployed by access node 110. Wireless devices 160a and 160b may be in communication with the access node 110 over a second RAT, which may be for example, an LTE communications link 165 provided by any LTE carrier connected to the access node 110. Further, wireless devices 140 and 150 are illustrated as being in communication with access node 110 over communication links 145 and 155 respectively. The communication links 145 and 155 utilize a carrier aggregation operating mode, i.e. they utilize wireless air interface resources from more than one carrier. For example, communication link 145 may utilize air-interface resources of at least one carrier utilizing the first RAT and at least another carrier, including any alternative carrier that in accordance with embodiments disclosed herein is using a second RAT and is connected with the access node 110. In embodiments a primary path may utilize an NR carrier and a secondary path may utilize an LTE carrier. Other configurations are within scope of the disclosure.

Access node 110 may be any network node configured to provide communication between end-user wireless devices 130a, 130b, 140, 150, 160a, and 160b and communication network 101, including standard access nodes such as a macro-cell access node, a base transceiver station, a radio base station, an eNodeB device, an enhanced eNodeB device, a next generation NodeB (or gNodeB) in 5G New Radio ("5G NR"), or the like. For example, access node 110 may implement 5G NR technologies to deploy a wireless network that supports frequency bands ranging from, e.g., 600 MHz to 100 GHz. In some embodiments, access node 110 may deploy a wireless network that supports frequency bands ranging from 3 GHz to 100 GHz. In some embodiments, access node 110 may deploy a wireless network that supports multiple frequency bands selected from 3 GHz to 100 GHz. In an exemplary embodiment, a macro-cell access node 110 may have a coverage area 115 in the range of approximately five kilometers to thirty-five kilometers and an output power in the tens of watts. In an embodiment, access node 110 may comprise two co-located cells, or antenna/transceiver combinations that are mounted on the same structure. Alternatively, access node 110 may comprise a short range, low power, small-cell access node such as a microcell access node, a picocell access node, a femtocell access node, or a home eNodeB device. In other embodiments, any other combination of access nodes and carriers deployed therefrom may be evident to those having ordinary skill in the art in light of this disclosure.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication link 106. Access node 110 may communicate with other access nodes (not shown), using a wireless link or a wired link such as an X2 link. Components of exemplary access nodes 110 are further described with reference to FIG. 2.

Wireless devices 130a, 130b, 140, 150, 160a and 160b may be any device, system, combination of devices, or other such communication platform capable of communicating wirelessly with access node 110 using one or more frequency bands and wireless carriers deployed therefrom. Each of wireless devices 130a, 130b, 140, 150, 160a, 160b may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data.

The wireless devices may be or include high power wireless devices or standard power wireless devices. Other types of communication platforms are possible.

Communication network 101 may be a wired and/or wireless communication network. Communication network 101 may include processing nodes, routers, gateways, and physical and/or wireless data links for communicating signals among various network elements. Communication network 101 may include one or more of a local area network, a wide area network, and an internetwork (including the Internet). Communication network 101 may be capable of communicating signals and carrying data, for example, to support voice, push-to-talk, broadcast video, and data communications by end-user wireless devices 130a, 130b, 140, 150, 160a, and 160b. Wireless network protocols may include one or more of Multimedia Broadcast Multicast Services (MBMS), code division multiple access (CDMA) 1×RTT (radio transmission technology), Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), Third Generation Partnership Project Long Term Evolution (3GPP LTE), Fourth Generation broadband cellular (4G, LTE Advanced, etc.), and Fifth Generation mobile networks or wireless systems (5G, 5G New Radio ("5G NR"), or 5G LTE). Wired network protocols utilized by communication network 101 may include one or more of Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 may include additional base stations, controller nodes, telephony switches, internet routers, network gateways, computer systems, communication links, or other type of communication equipment, and combinations thereof. The wireless network provided by access node 110 may support any of the above-mentioned network protocols.

Communication link 106 may use various communication media, such as air, laser, metal, optical fiber, or other signal propagation path, including combinations thereof. Communication link 106 may be wired or wireless and may use various communication protocols such as Internet, Internet protocol (IP), local-area network (LAN), optical networking, hybrid fiber coax (HFC), telephony, T1, or other communication format, including combinations, improvements, or variations thereof. Wireless communication links may be a radio frequency, microwave, infrared, or other signal, and may use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. In some embodiments, communication link 106 may include S1 communication links. Other wireless protocols may also be used. Communication link 106 may be a direct link or may include various intermediate components, systems, and networks. Communication link 106 may enable different signals to share the same link.

Gateway 102 may be a network node configured to interface with other network nodes using various protocols. Gateway 102 may communicate data (e.g., data related to a user) over system 100. Gateway 102 may be a standalone computing device, computing system, or network component, and may be accessible, for example, by a wired or wireless connection, or through an indirect connection such as through a computer network or communication network. For example, gateway 102 may include a serving gateway (SGW) and/or a public data network gateway (PGW), etc. One of ordinary skill in the art would recognize that gateway 102 is not limited to any specific technology architecture, such as Long Term Evolution (LTE) or 5G NR and may be used with any network architecture and/or protocol.

Gateway 102 may include a processor and associated hardware circuitry configured to execute or direct the execution of computer-readable instructions to obtain information. Gateway 102 may retrieve and execute software from a storage device, which may include a disk drive, a flash drive, or a memory circuitry or device, and which may be local or remotely accessible. The software may include computer programs, firmware, or other form of machine-readable instructions, and may include an operating system, utilities, drivers, network interfaces, applications, or other type of software, including combinations thereof. Gateway 102 may receive instructions and other input at a user interface.

Controller node 104 may be a network node configured to communicate information and/or control information over system 100. For example, controller node 104 may be configured to transmit control information associated with a handover procedure. Controller node 104 may be a standalone computing device, computing system, or network component, and may be accessible, for example, by a wired or wireless connection, or through an indirect connection such as through a computer network or communication network. For example, controller node 104 may include one or more of a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. The controller node 104 may further operate as an element management system that controls access nodes in the network 101. In this instance, the element management system may be operable to measure performance metrics and interference within the network 101. One of ordinary skill in the art would recognize that controller node 104 is not limited to any specific technology architecture, such as Long Term Evolution (LTE) or 5G NR and may be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes the database 105 for storing information related to elements within system 100, such as types and duplexing methods of carriers deployed by access node 110, power classes and carrier aggregation capabilities of wireless devices 130a, 130b, 140, 150, 160a, and 160b associations therebetween. This information may be requested by or shared with access node 110 via communication link 106, X2 connections, and so on. The database 105 may additionally store threshold values, such as for RSRP, SINR, or any signal strength parameter or other interference-related parameter that may be used in connection with handover criteria. The database 105 may further store one or more throughput thresholds for source and/or target nodes on a primary path for use in connection with handover criteria. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Additionally, the nodes may include relay nodes or other nodes requiring high performance. Relay nodes improve service quality by relaying communication between an access node, and end-user wireless devices in the wireless network. For example, relay nodes may be used at the edge of a coverage area of an access node to improve coverage and/or service. Relay nodes may also be used in crowded areas that have a high number of other wireless devices to increase the available throughput experienced by the wireless devices being relayed. Relay nodes are generally configured to communicate with the access node (i.e., a "donor" access node) via a wireless backhaul connection. Relay nodes typically deploy a radio air-interface to which end-user wireless devices can attach. Donor access nodes generally comprise scheduling modules that schedule resources used by wireless devices connected directly to the donor access node and also schedule the wireless backhaul connections for the various relay nodes connected thereto. Furthermore, other network elements that are omitted for clarity may be present to facilitate communication, such as additional processing nodes, routers, gateways, and physical and/or wireless data links for carrying data among the various network elements, e.g. between access node 110 and communication network 101.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

Figure 2:
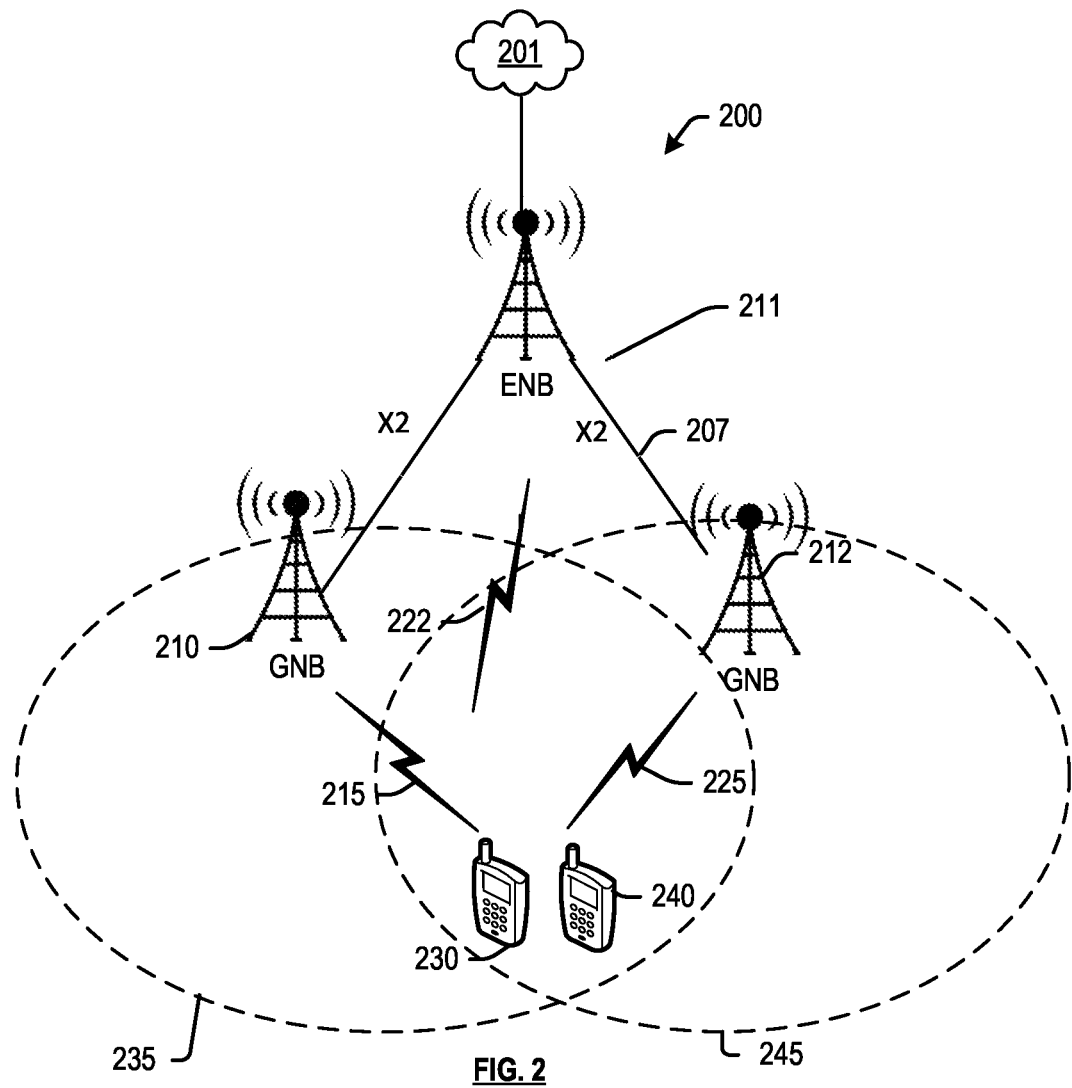
FIG. 2 illustrates an exemplary configuration of a 5G EN-DC radio access network.

FIG. 2 depicts an exemplary system 200 for E-UTRAN-NR Dual Connectivity (EN-DC) using 4G LTE and 5G NR. The access node 110 shown in FIG. 1 may utilize EN-DC using 4G LTE and 5G NR as shown. As shown in FIG. 1, the 4G LTE and 5G NR in a single node may be combined. System 200 includes network 201, access nodes 210, 211, and 212 and wireless devices 230 and 240.

In embodiments as set forth herein, access nodes 110 shown in FIG. 1, may include all of nodes 210, 211, and 212 and may include additional nodes. Information is transmitted over the wireless network 201 to wireless devices 230 and 240 via access node(s) 210, 211, and 212. Outgoing data packets received from the wireless devices 230 and 240 are routed via access node(s) 210, 211, and 212 to the network. Therefore, network 201 can include any combination of networks, including a core network, intermediate/backhaul network, or packet data network (PDN). Persons having ordinary skill in the art may note that although only access nodes 210, 211, and 212, and network 201 are illustrated in FIG. 2, other components such as gateways, controller nodes, user plane functions, etc. may be included as well.

In this exemplary embodiment, access node 210 can include a gNodeB, access node 211 can include an eNodeB, and access node 212 can include a gNodeB. In embodiments set forth herein, the access node 211 may be a master node and nodes 210 and 212 can operate as secondary nodes. In this one-to-many configuration, the eNodeB 211 is designated as the master node for wireless devices that can assign the wireless devices to the secondary nodes 210 and 212, which are illustrated as gNodeBs. For example, access node 211 deploys a first wireless air interface 222 using a first RAT, e.g., 4G LTE. Access node 210 can be configured to deploy a wireless interface 215 using a second RAT, e.g. 5G NR. Access node 212 deploys a wireless air interface 225, which can also utilize a 5G NR RAT. Each RAT can be configured to utilize a different frequency band or sub-band, a different channel size or bandwidth, and so on. For example, the 5G NR wireless interfaces 215 and 225 can be configured to utilize higher frequencies and larger channel bandwidths than the 4G LTE wireless interface 215. Further, the wireless devices 230, 240 can be configured to communicate using both RATs at the same time. For example, dual connections can be set up with one or both of the wireless devices 230 and 240 using both 4G and 5G air interfaces respectively, the 4G wireless interface 222 being used to transmit control information, and one of the 5G wireless interfaces (e.g. 5G interface 215) being used to transmit data information. For example, a processing node communicatively coupled to access node 211 can be configured to determine whether or not the wireless devices 230 and 240 are capable of communicating using both RATs (e.g. capable of 5G EN-DC) and instruct the access node 211 to broadcast an indicator in, for example, a system information message. Responsive to the indicator, the wireless devices 230 and 240 can attach to access node 211 which can use the 4G carrier to control and set up a dual connectivity session with the wireless devices 230, 240. Further, access node 211 can function as a master node and be configured to perform methods described herein to select one (or more) of access nodes 210, 212 as a secondary node for the wireless devices 230 and 240. The RAT air interface deployed by the secondary nodes 210 and 212 may function as a primary path for the wireless devices 230 and 240, thereby accommodating a larger quantity of data than over the secondary path to the master node 211. Further, access nodes 210 and 212 (hereinafter "secondary nodes") can each be coupled to master node 210 via X2 communication links.

Further, a processing node communicatively coupled to any of access nodes 210, 211, 212 can be configured to allocate air interface resources to wireless devices 230 and 240 and to measure and compare available throughput of the secondary nodes 210 and 212.

Further, within radio access network 201, access nodes 210, 211, 212 can be coupled via a direct communication link 207, which can include an X2 communication link. Access nodes 210, 211, and 212 can communicate control and data information across X2 communication links. In an exemplary embodiment, access node 211 includes logic to determine how to allocate data packets between access node 211 and the secondary access nodes 210, 212, wherein the data packets flow between wireless devices 230 and 240 and a network node on network 201. Such logic may include a packet data convergence protocol (PDCP) function. Thus, a plurality of antenna elements (not shown herein) can be coupled to access nodes 210, 211, 212, with different antenna elements configured to deploy a different radio air interface using a different frequency. For example, each antenna element can be configured to deploy a 4G LTE air interface 222 or a 5G NR air interface 215, 225. Different quantities of antenna elements can be configured to deploy (or "assigned" to) a different type of air interface 215, 222, 225, depending on the needs of a network operator or users. Further, in split mode or "concurrent mode", individual antenna elements can be configured to simultaneously deploy at least two different air interfaces 215, 222, which enables wireless devices 230, 240 to transmit uplink data via two air interfaces selected from 215, 222, and 225 simultaneously. In an exemplary embodiment, the eNodeB 211 is configured with logic to determine a transmission path for data packets. The transmission paths can traverse different RAT air interfaces 215, 22, 225. The one-to-many configuration illustrated in FIG. 2 allows a master node 211 to manage connections to multiple secondary nodes 210, 212.

In accordance with embodiments set forth herein, the master node 211 may determine if a wireless device, such as the wireless device 230, should be subject to a handover from a source node 210 to a target node 212 on the primary path. The determination may be made based at least on throughput measurements at the source node 210 and the target node 212.

Further, the methods, systems, devices, networks, access nodes, and equipment described herein may be implemented with, contain, or be executed by one or more computer systems and/or processing nodes. The methods described above may also be stored on a non-transitory computer readable medium. Many of the elements of communication systems 100 and 200 may be, comprise, or include computers systems and/or processing nodes. This includes, but is not limited to: access nodes 110, 210, 211, 212, controller node 104, and/or networks 101 and 201.

Figure 3:
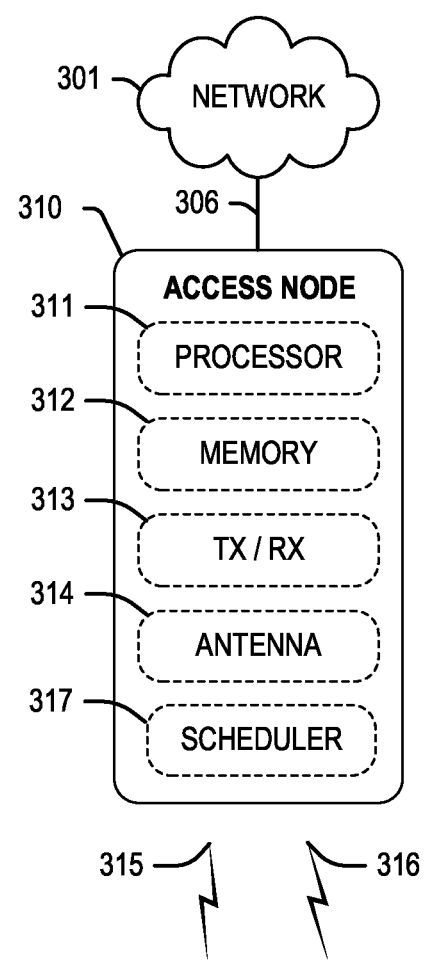
FIG. 3 illustrates an exemplary configuration of an access node in accordance with disclosed embodiments.

FIG. 3 depicts an exemplary access node 310. Access node 310 may comprise, for example, a macro-cell access node, such as access node 110 described with reference to FIG. 1. Access node 310 is illustrated as comprising a processor 311, memory 312, transceiver 313, antenna 314, and scheduler 317. Processor 311 executes instructions stored on memory 312, while transceiver 313 and antenna 314 enable wireless communication with other network nodes, such as wireless devices and other nodes. For example, access node 310 may be configured to determine whether signal strength parameters or interference parameters for a wireless device satisfy a threshold for handover when the wireless device is connected to a source node over a primary path. The access node 310 may be further configured to determine when available throughput at the source and/or target node on the primary path satisfies a threshold. When the thresholds are satisfied, the access node 310 may be configured to dynamically instruct the wireless devices to handover from the source node to the target node Scheduler 317 may be provided for scheduling resources based on measurement reports from the wireless devices. These features may be enabled by access node 310 comprising two co-located cells, or antenna/transceiver combinations that are mounted on the same structure. Network 301 may be similar to networks 101 and 201 discussed above. The wireless devices may operate in carrier aggregation mode, during which a wireless device utilizes more than one carrier, enabling the wireless devices to communicate with access node 310 using a combination of resources from multiple carriers. Further, instructions stored on memory 312 can include instructions for dynamically triggering handovers based on evaluation of throughput measurements of a source node and target node on the primary path, which will be further explained below with reference to FIGS. 5-7.

Figure 4:
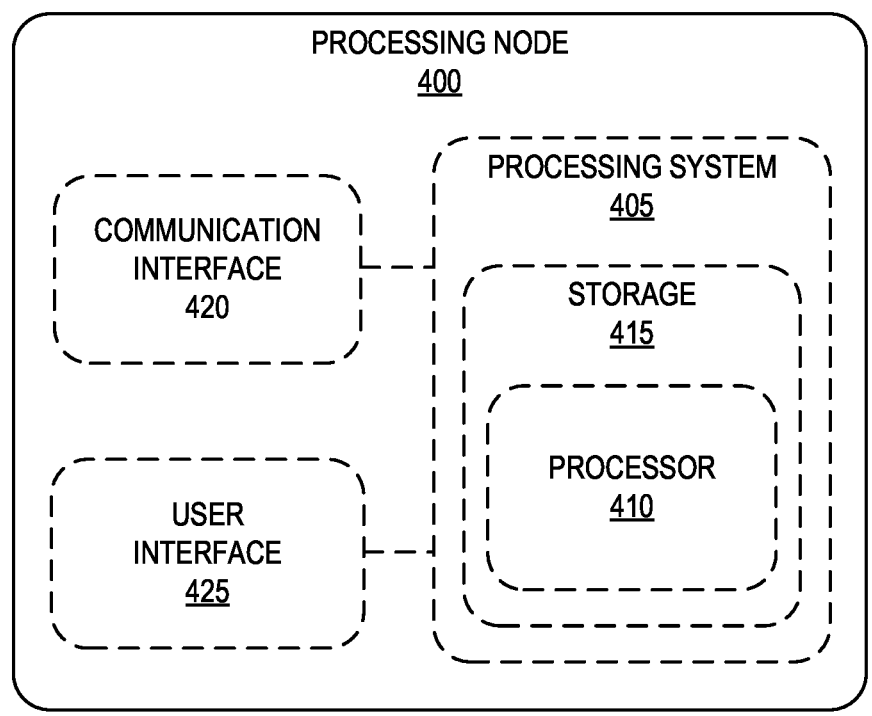
FIG. 4 depicts a processing node in accordance with disclosed embodiments.

FIG. 4 depicts an exemplary processing node 400, which may be configured to perform the methods and operations disclosed herein to dynamically trigger a handover based on throughput measurements in order to improve performance in a wireless network. In some embodiments, processing node 400 may be included in an access node, such as access node 110, 210, or 310. In further embodiments, processing node 400 may be included in controller node 104 and may be configured for controlling the access nodes.

Processing node 400 may be configured to dynamically trigger a handover based on throughput evaluation of source and target nodes on a primary path as further explained herein. The handover evaluation may be performed dynamically in real time based on a threshold comparison or criteria evaluation in a network, such as the network 101. Processing node 400 may include a processing system 405. Processing system 405 may include a processor 410 and a storage device 415. Storage device 415 may include a disk drive, a flash drive, a memory, or other storage device configured to store data and/or computer readable instructions or codes (e.g., software). The computer executable instructions or codes maybe accessed and executed by processor 410 to perform various methods disclosed herein. Software stored in storage device 415 may include computer programs, firmware, or other form of machine-readable instructions, including an operating system, utilities, drivers, network interfaces, applications, or other type of software. For example, software stored in storage device 415 may include a module for performing various operations described herein. Processor 410 may be a microprocessor and may include hardware circuitry and/or embedded codes configured to retrieve and execute software stored in storage device 415.

Processing node 400 may include a communication interface 420 and a user interface 425. Communication interface 420 may be configured to enable the processing system 405 to communicate with other components, nodes, or devices in the wireless network. Communication interface 420 may include hardware components, such as network communication ports, devices, routers, wires, antenna, transceivers, etc. User interface 425 may be configured to allow a user to provide input to processing node 400 and receive data or information from processing node 400. User interface 425 may include hardware components, such as touch screens, buttons, displays, speakers, etc. Processing node 400 may further include other components such as a power management unit, a control interface unit, etc.

Figure 5:
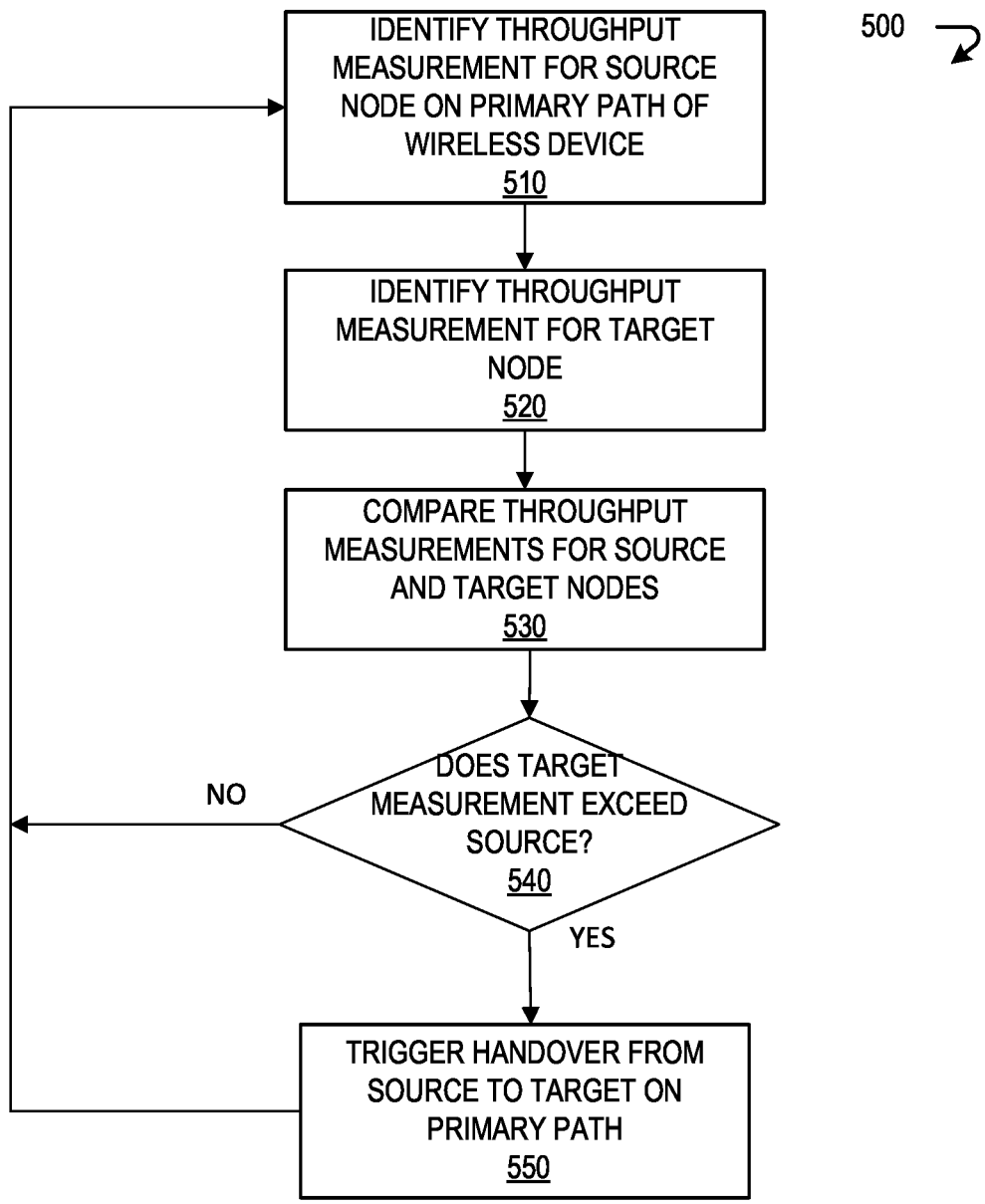
FIG. 5 depicts a method for dynamically managing a handover in accordance with the disclosed embodiments.

The disclosed methods for dynamically triggering handovers based on throughput are discussed further below. FIG. 5 illustrates an exemplary method 500 for dynamically triggering a handover for a wireless device in a network. Method 500 may be performed by any suitable processor discussed herein, for example, a processor included in access node 110, 210, 310, or processor 410 included in processing node 400, or a processor included in controller node 104. For discussion purposes, as an example, method 500 is described as being performed by a processor included in access node 110. Method 500 starts in step 510 and the access node 110 may determine a throughput measurement for a source node on a primary path of a wireless device. In step 520, the access node may identify a throughput measurement for a target node on the primary path.

Throughput is the rate of successful message delivery over a communication channel and refers to how much data can be transferred from one location to another in a given amount of time. Throughput is usually measured in bits per second (bit/s or bps), and can be measured in data packets per second (p/s or pps) or data packets per time slot. The throughput of a communication system may be impacted by various factors, including the limitations of underlying analog physical medium, available processing power of the system components, and end-user behavior. When various protocol overheads are considered, the useful rate of the transferred data can be significantly lower than the maximum achievable throughput.

One method for performing throughput measurement is to transfer a 'large' file from a wireless device to an access node and measure the time required to complete the transfer or copy of the file. The throughput is then calculated by dividing the file size by the time consumed. This calculation may be referred to as "goodput", which is less than maximum theoretical throughput due to the overhead and system limitations discussed above. Other throughput measurement techniques are within scope of the disclosure. For example, the throughput measurement may be a peak measured throughput, also known as instantaneous throughput. The value is representative of the throughput measured over a short period of time or mathematically, this is the limit taken with respect to throughput as time approaches zero. Alternatively, the throughput measurement may be a maximum sustained throughput measurement. Maximum sustained throughput is the throughput averaged or integrated over a longer time period. Any of these methods or other known methods may be utilized in steps 510 and 520.

In step 530, the access node 110 compares the throughput measurements for the source and target nodes. If the target measurement does not equal or exceed the source measurement, the access node 110 may continue to identify throughput measurements as the measurements are prone to change based on overhead. However, if the throughput measurement at the target node exceeds or equals the throughput measurement at the source node in step 540, the access node 110 triggers a handover from the source node to the target node in step 550.

In order to trigger the handover, the access node 110 may drop the currently connected secondary source node on the primary path and subsequently add the alternate target secondary node on the primary path. In operation, the access node 110 may send a message, such as an RRC reconfiguration message to the wireless device to connect to the target node.

Figure 6:
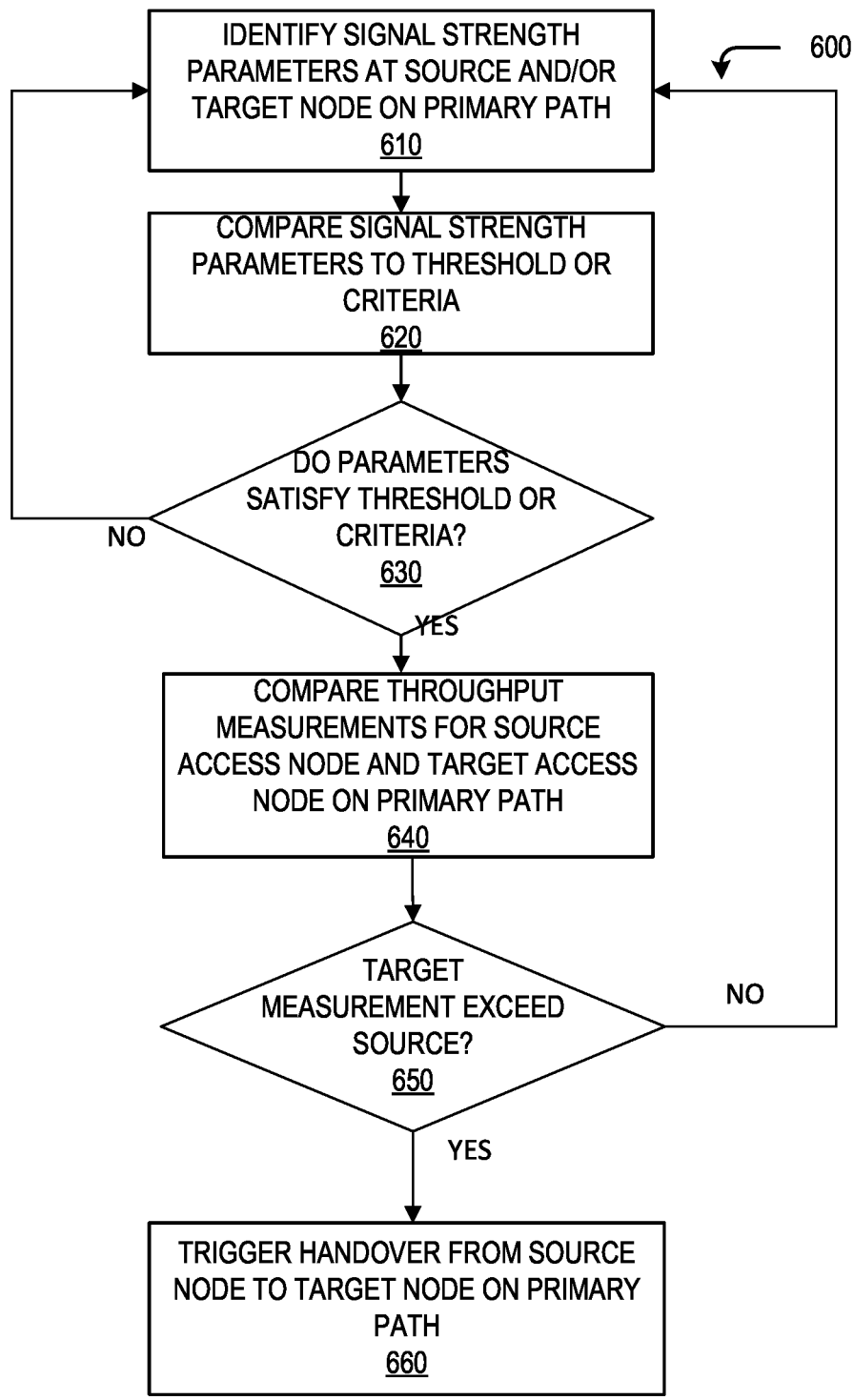
FIG. 6 depicts an exemplary method for dynamically managing a handover on a primary path in accordance with disclosed embodiments.

FIG. 6 depicts an additional exemplary method 600 for dynamically triggering a handover. Method 600 may be performed by any suitable processor discussed herein, for example, a processor included in access node 110, 210, 310, or processor 410 included in processing node 400, or a processor included in controller node 104. For discussion purposes, as an example, method 600 is described as being performed by a processor included in access node 110.

In step 610, the access node 110 identifies signal strength or interference parameters for the source and/or target node for the wireless device the primary path. For example, the access node 110 may identify RSRP at the source node and the target node. The values may be measured by the wireless device and reported to the access node 110, for example through a channel state information (CSI) report.

In step 620, the access node 110 compares the identified values to a predetermined threshold or to predetermined criteria. For example, the access node 110 may determine if the source node offers a signal strength worse than a particular threshold or if the target node offers a signal strength better than particular threshold. Alternatively, in accordance with predetermined criteria, which may require satisfaction of multiple thresholds, the access node 110 may find that the source node becomes worse than a threshold and that the target node becomes better than a threshold. The particular criteria for triggering a handover may be stored in the database 105 and may be retrieved by the access node 110.

In step 630, the access node 110 may determine if the signal strength parameters satisfy the threshold or criteria retrieved from the database 105. If the parameters do not satisfy the threshold or criteria in step 630, the access node returns to monitoring in step 610. However, if the parameters do satisfy the threshold or criteria in step 630, the system may compare throughput measurements for the source access node and the target access node on the primary path in step 640. As set forth above, throughput may be measured in a number of ways and reported to the access node 110 or retrieved from an element management system.

In step 650, the access node determines if the target throughput measurement exceeds or equals the source throughput measurement in step 650. If the target measurement does not exceed or equal the source measurement in step 650, the access node may return to monitoring in step 610. However, if the target throughput measurement exceeds or equals the source throughput measurement in step 650, the access node 110 may trigger a handover from the source node to the target node on the primary path in step 660. The access node 110 may, for example, send an RRC reconfiguration message to the wireless device instructing the wireless device to drop from the source node and attach to the target node.

Figure 7:
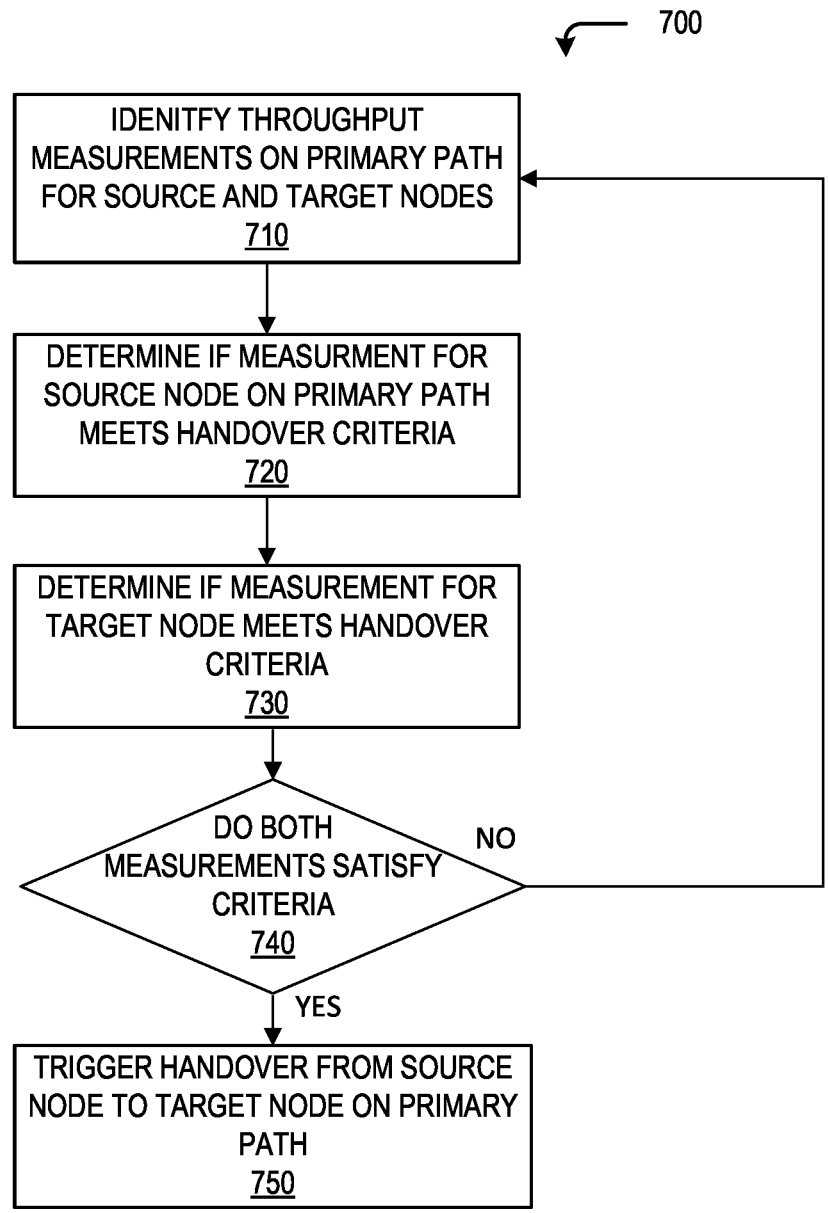
FIG. 7 depicts another exemplary method for dynamically managing a handover on a primary path in accordance with disclosed embodiments.

FIG. 7 illustrates a method 700 for dynamically triggering a handover for a wireless device in a network. Method 600 may be performed by any suitable processor discussed herein, for example, a processor included in access node 110, 210, or 310, or processor 410 included in processing node 400, or a processor included in controller node 104. For discussion purposes, as an example, method 700 is described as being performed by a processor included in access node 110.

In step 710, the access node 110 identifies throughput measurements on the primary path for a source node and target node. The throughput may be measured in any manner as discussed above. In step 720, the access node 110 determines if the throughput measurement for the source node on the primary path meets predetermined handover criteria. The criteria may include, for example, a threshold throughput stored in the database 105 and retrieved by the access node 110. In embodiments set forth herein, the measurement would satisfy the stored handover criteria if the throughput of the source node were to fall below the stored threshold. Similarly, in step 730, the access node 110 determines if a measurement for the target node meets handover criteria that may be stored in the database 105. The criteria may include, for example, a particular threshold for the target node. If the target node measurement exceeds the stored threshold, then the target node meets the handover criteria.

In step 740, the access node 110 determines if both measurements satisfy the handover criteria. Thus, if neither of the measurements or only one of the source and target node measurements satisfies the handover criteria, the system returns to identification of throughput measurements in step 710. However, if both measurements satisfy the handover criteria, the access node dynamically triggers a handover in step 750.

Further, the method 700 may be combined with steps in the method 600 to determine that signal strength or interference criteria are met. Thus, the method 700 may in some circumstances, only be triggered when the signal strength parameters at the source node and/or target node meet stored predetermined criteria. Thus, the method aims to provide dynamic handover triggers, particularly in an EN-DC 5G NR cell to improve overall performance of the network by considering throughput of a source node on the primary path and a target node on the primary path prior to triggering a handover.

In some embodiments, methods 500, 600, and 700 may include additional steps or operations. Furthermore, the methods may include steps shown in each of the other methods. As one of ordinary skill in the art would understand, the methods 500, 600, and 700 may be integrated in any useful manner.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for managing a handover of a wireless device, the method comprising;
   identifying a primary path and a secondary path for the wireless device based on a percentage of a total volume of data transmitted over the primary path and the secondary path for the wireless device, wherein the secondary path connects the wireless device to a master node and the primary path connects the wireless device to a secondary node, wherein the wireless device is connected to the master node and the secondary node simultaneously;
   identifying a first signal strength parameter at the connected secondary node, the connected secondary node functioning as a source access node for the primary path of the wireless device;
   identifying a second signal strength parameter at a target access node for the primary path, wherein the target access node is another secondary node:
   determining that the first signal strength parameter at the connected secondary node is less than a predetermined threshold and the second signal strength parameter at the target access node is greater than the predetermined threshold;
   upon determining that the first signal strength parameter at the connected secondary node is less than the predetermined threshold and the second signal strength parameter at the target access node is greater than the predetermined threshold, measuring a first throughput at the source access node and a second throughput at the target access node;
   comparing the first throughput measurement at the source access node to the second throughput measurement at the target access node; and
   making a handover determination for the wireless device based on the comparison of the first throughput measurement with the second throughput measurement.

2. The method of claim 1, wherein the first and second signal strength parameters are reference signal received power (RSRP).

3. The method of claim 1, wherein making the handover determination comprises selecting the target access node as a new secondary node for providing the primary path for the wireless device when the second throughput measurement exceeds the first throughput measurement.

4. The method of claim 1 wherein the primary path utilizes a first radio access technology (RAT) and the secondary path utilizes a second RAT.

5. The method of claim 4, further comprising executing the handover by dropping the source access node and adding the target access node for connection with the wireless device, thereby allowing the wireless device to remain connected to the first RAT through the master node and the second RAT through the target access node.

6. The method of claim 1, further comprising determining that a reference signal receive power (RSRP) at the source access node and the target access node satisfies the first predetermined threshold prior to comparing the first throughput measurement with the second throughput measurement.

7. The method of claim 1, further comprising delaying the handover of the wireless device from the source access node to the target access node based on the comparison of the first and second throughput measurements.

8. The method of claim 1, further comprising delaying the handover when the second throughput measurement of the target access node is below a first predetermined value.

9. The method of claim 8, wherein the first predetermined value is equal to the first throughput measurement.

10. The method of claim 1, further comprising delaying the handover until the first signal strength parameter at the source access node satisfies the predetermined threshold.

11. The method of claim 1, further comprising making the first and second throughput measurements dynamically at the source access node and the target access node.

12. The method of claim 1, further comprising retrieving the first throughput measurement and the second throughput measurement from an element management system.

13. The method of claim 1, further comprising performing the method at the master node, wherein the source access node and the target access node are secondary nodes.

14. A system comprising:
   at least one master node, the master node connecting with a wireless device through a secondary path, and multiple secondary nodes, one of the secondary nodes functioning as a source access node and providing a primary path for the wireless device, wherein the primary path and the secondary path for the wireless device are determined based on a percentage of a total volume of data transmitted over the primary path and the secondary path for the wireless device;
a processor coupled to the master node configured to perform operations comprising,
determining the first signal strength parameter at the connected secondary node is less than a predetermined threshold and the second signal strength parameter at the target access node is greater than the predetermined threshold;
upon determining that the first signal strength parameter at the connected secondary node is less than the predetermined threshold and the second signal strength parameter at the target access node is greater than the predetermined threshold, measuring a first throughput at the source access node and a second throughput at the target access node;
comparing the first throughput measurement at the source access node to a the second throughput measurement at the target access node; and
making a handover determination for the wireless device based on the comparison of the first throughput measurement with the second throughput measurement.

15. The system of claim 14, wherein making the handover determination comprises selecting the target access node as a new secondary node providing the primary path to the wireless device when the second throughput measurement exceeds the first throughput measurement.

16. The system of claim 15, wherein the wireless device connects to the master node using a first RAT and to the secondary node using a second RAT.

17. The system of claim 16, the operations further comprising executing the handover by dropping the source access node and adding the target access node for connection with the wireless device, thereby allowing the wireless device to remain connected to the first RAT through the master node and the second RAT through the target access node.

18. A processing node configured to perform operations comprising:
identifying a primary path and a secondary path for a wireless device, wherein the secondary path connects the wireless device to a master node and the primary path connects the wireless device to a secondary node, wherein the wireless device connects to the master node and the secondary node simultaneously, and wherein the identification of the primary path and the secondary path for the wireless device is based on a percentage of a total volume of data transmitted over the primary path and the secondary path for the wireless device;
determining the first signal strength parameter at the connected secondary node is less than a predetermined threshold and the second signal strength parameter at the target access node is greater than the predetermined threshold;
upon determining that the first signal strength parameter at the connected secondary node is less than the predetermined threshold and the second signal strength parameter at the target access node is greater than the predetermined threshold, measuring a first throughput at the source access node and a second throughput at the target access node;
comparing the first throughput measurement at the source access node to the second throughput measurement at the target access node; and
making a handover determination for the wireless device based on the comparison of the first throughput measurement with the second throughput measurement.

19. The processing node of claim 18, the operations comprising executing a handover when the second throughput measurement exceeds the first throughput measurement by dropping the source access node and adding the target access node for connection with the wireless device.

20. The processing node of claim 19, the operations further comprising delaying a handover of the wireless device from the source access node to the target access node when the first throughput measurement exceeds the second throughput measurement, wherein the wireless device remains connected to the master node and the source access node.

* * * * *